United States Patent [19]

Soutar et al.

[11] Patent Number: 5,644,505
[45] Date of Patent: Jul. 1, 1997

[54] UNIVERSAL AUDIO ANALYZER

[75] Inventors: Larry W. Soutar; Ronald W. Dale, both of Kokomo, Ind.

[73] Assignee: Delco Electronics Corporation, Kokomo, Ind.

[21] Appl. No.: 418,349

[22] Filed: Apr. 7, 1995

[51] Int. Cl.[6] .................................................. G06F 17/00
[52] U.S. Cl. ................................................. 364/514 B
[58] Field of Search ........................... 364/514 B, 514 R, 364/579, 580, 581.01, 620; 381/60

[56] References Cited

U.S. PATENT DOCUMENTS

| | | | |
|---|---|---|---|
| 3,922,506 | 11/1975 | Frye et al. | 381/60 |
| 4,065,647 | 12/1977 | Frye et al. | 381/60 |
| 5,381,143 | 1/1995 | Shimoyoshi et al. | 381/60 |
| 5,420,516 | 5/1995 | Cabot | 327/620 |
| 5,544,248 | 8/1996 | Date | 381/60 |

*Primary Examiner*—Ellis B. Ramirez
*Attorney, Agent, or Firm*—Jimmy L. Funke

[57] ABSTRACT

A desktop computer having stereo audio input and output ports is used with an interface board to supply test tones to an audio device being tested. The interface feeds back the test device outputs to the computer audio input ports. The interface, under control of the computer, selects any two of several inputs from the device and attenuates the two signals to the optimum amplitude for analysis. The computer digitizes the audio inputs and simultaneously analyzes the signals by software operations in either time or frequency domain along with appropriate filtering to quickly obtain results according to standard test specifications.

6 Claims, 2 Drawing Sheets

UNIVERSAL AUDIO ANALYZER

FIELD OF THE INVENTION

This invention relates to a test apparatus for an audio device and particularly to an audio analyzer for testing and alignment of audio frequency products.

BACKGROUND OF THE INVENTION

Radios, tape players, sound systems or other equipment having an audio output require alignment during manufacture and may need sound quality testing. For these purposes audio analyzers are known which perform a variety of tests and are very expensive; such equipment includes dedicated boards including microprocessors for digital signal processing and control panels. When using such analyzers with a test controller which supervises analyzer operation as applied to a large number or variety of products, additional costs are invoked for interface circuits for communication with the test controller as well as for a computer which comprises the controller.

The dedicated analyzer, moreover, includes a fixed set of standard filters which are useful for audio analysis but has no provision for the addition of specialized filters which may be needed for testing certain products. In addition, the measurement technique itself is fixed and new techniques cannot be used. Even the simple improvement of sampling for a longer signal interval is not possible due to limited memory in the analyzer. In short, the dedicated analyzer is not flexible.

It has been found that by using relatively inexpensive general purpose microprocessor apparatus for the signal processing, equivalent analysis can be performed by equipment at a fraction of the cost of the known analyzers.

SUMMARY OF THE INVENTION

It is therefore an object of the invention to perform audio analysis at a lower cost than previously possible. Another object is to provide flexibility in audio analysis while maintaining a low equipment cost.

The test controller (previously used to control a dedicated audio analyzer and monitor the results) is used instead of the dedicated unit to perform the analysis, and an interface is used to select channels and adjust signal level, thereby eliminating the expensive specialized hardware. A desktop computer having stereo audio input and output capability is the main portion of the audio analyzer and a separate inexpensive interface board under control of the computer prepares input audio signals for analysis by the computer.

The system can process two channels simultaneously and the interface board has two sets of multiple inputs, one for each channel, and switch devices to choose two inputs from each set, and analog switches to choose one of each two inputs. Thus up to eight channels can be tested and, due to the analog switches, an audio source having four channels can be tested quickly, two at a time. The interface board also has attenuators before the analog switches to prevent switch overload and gain circuits following the analog switches to restore the signal level and to compensate for inequalities in the two channels. A controllable attenuator at the output of each channel adjust the signal level to an optimum value for input to the computer. The latter attenuator as well as all the switching is under computer control.

The computer has two audio outputs which are coupled to the device under test to supply test tones. In the case of a radio, the tones are coupled via an RF generator which supplies radio test signals. The audio outputs comprise digital-to-analog (D/A) converters. Similarly, the audio inputs of the computer comprise analog-to-digital (A/D) converters. Digital outputs from the computer are coupled to the switches and attenuators of the interface to effect selection and level control of input signals. Software makes the selection and signal level decisions and also analyzes the signals. Well known audio analysis techniques and weighting filters are embodied in the software to analyze the digitized signals and return a variety of measurements including time domain measurements and RMS measurements including signal-to-noise and distortion which are accomplished through fast Fourier transform (FFT) techniques. A control program for each type of device to be tested determines the channel selection and chooses the particular tests to be made. The software is not limited to the standard filters and measurement techniques. Whenever a specialized filter is needed, it is readily included in the software without any additional equipment. Because of the nature of desktop computers large amounts of memory are available, thus allowing large audio samples to be stored and analyzed. New measurement techniques are easily implemented by software modification.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
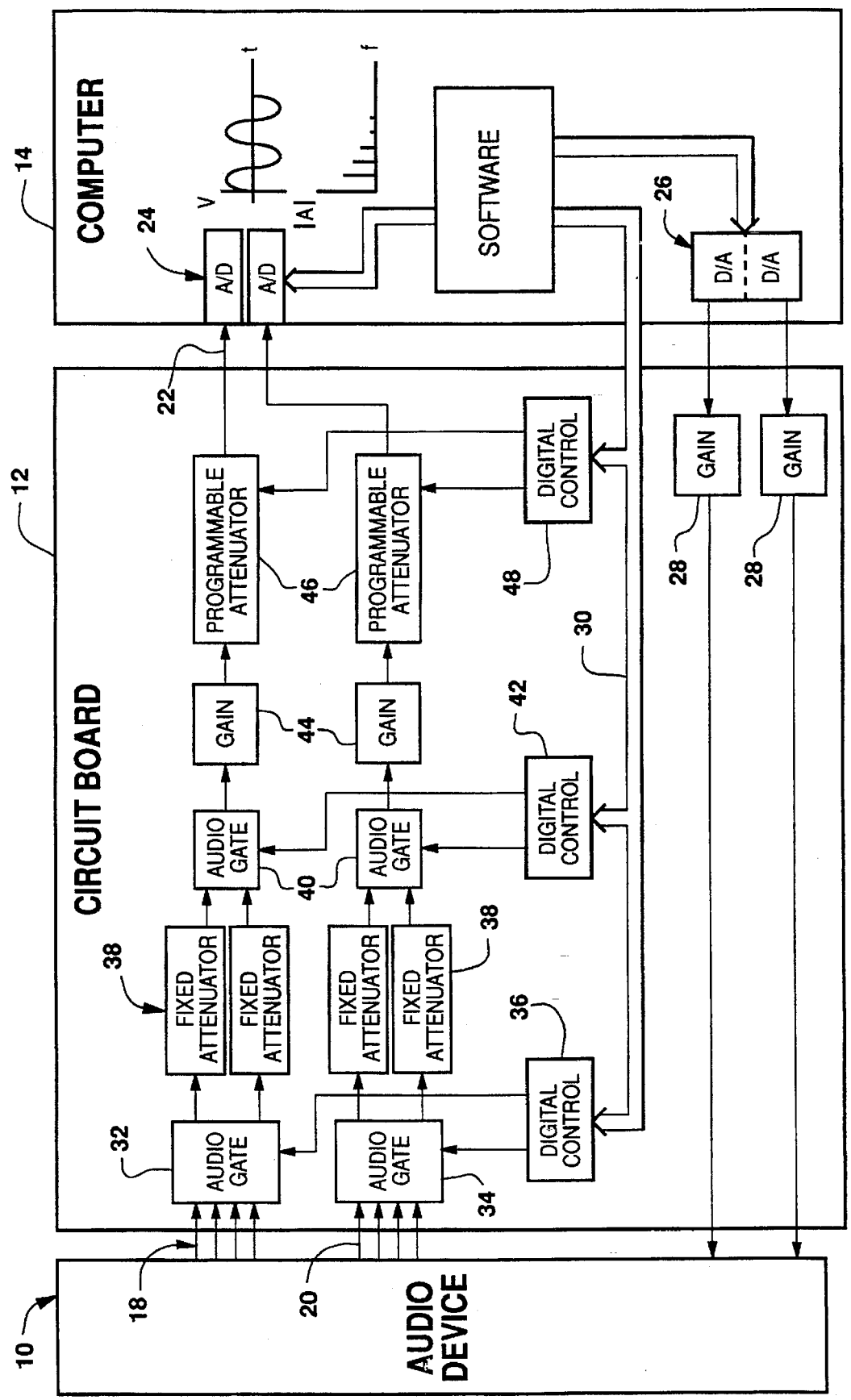
FIG. 1 is a block diagram of a device under test and an audio analyzer according to the invention.

Referring to FIG. 1, an audio device 10 is connected to an interface board 12 which, in turn, is connected to a personal (or desktop) computer 14. The audio device is the product to be tested and may comprise an audio source such as a radio, tape deck, or CD player, or a sound system incorporating a sound source. The audio device 10 may have up to eight output channels coupled to the interface board 12 as shown, although any number may be used. The interface board 12 has its inputs arranged in two sets 18 and 20, each set supplying one channel to the computer for test via outputs 22.

The computer 14 has A/D converters 24 for receiving and digitizing audio signals from the interface board 12, and D/A converters 26 for outputting analog sound signals to the interface board. Amplifiers 28 on the board 12 increase the sound signals and supply test tone inputs to the audio device 10. In the case of radios, the test tones are fed to a radio frequency generator (not shown) which supplies RF signals carrying the test tones to the radio. The test tones, when fed back to the computer via the audio device 10 and the interface board 12 are analyzed by software installed in the computer 14. The software also determines the optimum amplitude of the inputs and issues attenuation instruction on a digital control bus 30. A control program specific to the device under test selects the channels to be tested and controls the selection via the control bus 30 and also chooses which of several available analyses should be performed.

The interface board 12 has two audio gates 32, 34 for receiving the two sets of inputs 18 and 20, respectively. The gates, which may be relays for example, are operated by digital control 36 which is controlled by commands on the control bus 30. Each gate 32, 34 selects two of the inputs and feeds them through fixed attenuators 38 to a second set of audio gates 40. The audio gates 40 are preferably solid state analog switches each with two inputs and a single output. The gates 40 are under control of the computer via the command bus and digital control 42. The fixed attenuators 38 reduce the signals by a factor of two to assure that the signals are not too large for the gates 40. Gain amplifiers 44 following the gates 40 are adjusted to restore the signals to their original amplitude and to compensate for gain variances in the two sets of gates, whereby the two channels will treat the input signals in the same manner. The output stage of each channel is a programmable solid state attenuator 46 under control of the computer via the control bus and a digital control 48. The attenuators 46 are auto ranged by the computer software to insure the best range for each measurement. Four separate ranges provide sufficient dynamic range for most audio system applications.

The software can determine the average frequency, average amplitude, true RMS amplitude and SINAD (signal-to-noise and distortion) for any of the eight input channels. The system samples two samples simultaneously and provides solid state switching between two pairs of inputs. This provides very fast switching for products with four channels.

Figure 2:
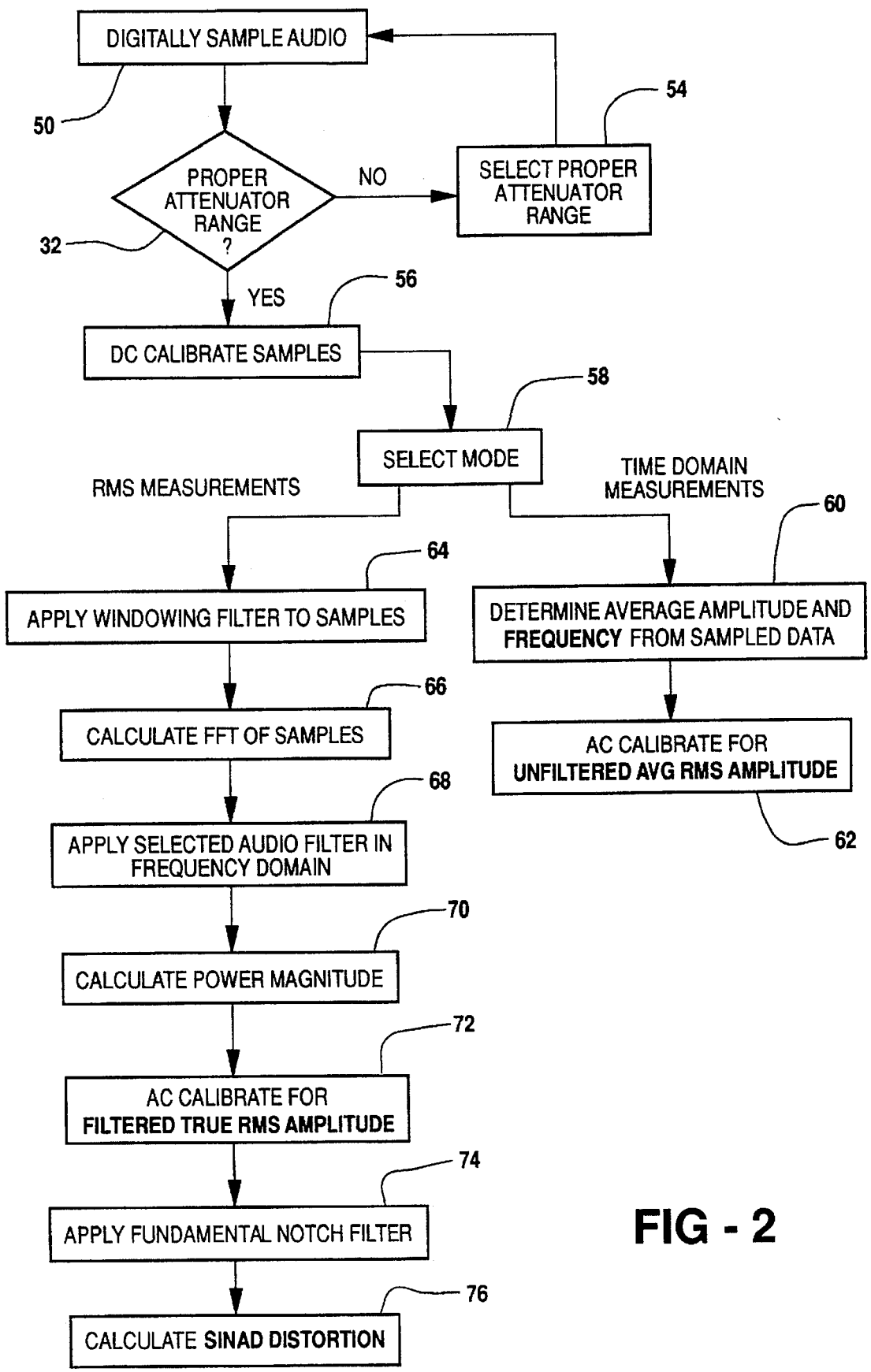
FIG. 2 is a flow chart generally representing software function performed by the audio analyzer.

FIG. 2 is a general representation of the software operation. The functional description of each block in the chart is accompanied by a number in angle brackets <nn> which corresponds to the reference number of the block. First the audio signal is sampled digitally <50>. The signal amplitude is checked to determine whether the signal is at an optimum value for analysis <52>, and if not, a correct range is selected <54> and implemented via the control bus 30 and attenuators 46. When the signal level is correct, the samples are DC calibrated <56>, i.e. since the digitization values are all positive, a reference value, measured when no signal is present, is subtracted from each sample to compensate for the positive bias, thereby establishing a zero level about which the values vary. Then the measurement mode is selected by the control program <58> to request either RMS or time domain measurements.

If time domain measurements are selected, the average amplitude and frequency is obtained from the data <60> and calibrated to obtain the unfiltered average RMS amplitude <62>. If RMS measurements are selected a windowing filter is applied <64> to qualify the data for a following FFT procedure <66> which transforms the data to the frequency domain. Then a selected filter is called from memory and applied to the data <68>. The audio filters are implemented entirely in software, and can be customized to any shape. It is preferred that the software support programmable low pass, high pass, notch and band pass filters. Standard filters are included for CCIR/ARM, CCIR weighted, CCIR unweighted, and dB(A). Although the standard filters are necessary for conventional measurements, custom filters are easily included in the software for use in special situations. All filters are implemented prior to true RMS or SINAD calculations so that the system can properly evaluate distortion with any of the filters implemented. After filtering, power magnitude is calculated <70> from the filtered data and then calibrated to obtain filtered true RMS amplitude <72>. A notch filter is applied <74> to remove the fundamental tone frequency and SINAD distortion is calculated <76>. While a conventional measurement technique is described here, it will be appreciated that the flexibility of a desktop computer permits new or experimental measurements to be made as well.

The analyzer is a low cost, high speed digital audio analyzer suitable for the testing and alignment of audio frequency products. The cost is kept low by utilizing the hardware (A/D and D/A converters) built into the computer, and using the software for analyzing the signals. Because the signals are sampled digitally (two samples simultaneously) and analyzed by the computer, it is possible to make measurements at or near the theoretical threshold for speed (i.e. a single cycle of a signal can be used to determine amplitude and frequency). On the other hand, due to the large memory of the computer, a long signal interval can be used.

The embodiments of the invention in which an exclusive property or privilege is claimed are defined as follows:

1. An audio analyzer for receiving signals from an audio device under test, the analyzer comprising:
   a computer for analyzing at least one audio channel and having an audio input; and
   an interface having a plurality of input channels for coupling signals from the audio device to the audio input of the computer;
   the computer having an audio output for coupling test tones to the device, a control output for controlling the interface, and means for digitally analyzing input signals, and
   the interface being coupled to the control output and including switch means under computer control for selecting inputs, and attenuation means under computer control for adjusting the amplitude of input signals.

2. The invention as defined in claim 1 wherein:
   the computer has means for simultaneously analyzing two channels from the audio device;
   the computer audio input has two channels and means for simultaneously digitizing two signals from the audio device; and
   the switch means is controlled to select two channels from the audio device for analysis.

3. The invention as defined in claim 1 wherein:
   the plurality of input channels comprise two sets of inputs;
   the switch means of the interface including audio gates for selecting one channel from each set of inputs; and
   the attenuation means including a digitally controlled programmable attenuator for each selected channel.

4. The invention as defined in claim 1 wherein:
   the plurality of input channels comprise two sets of inputs;
   the switch means of the interface including a first pair of audio gates for selecting two channels from each set of inputs, and a second pair of audio gates serially coupled to the first pair for further selecting one channel from each set.

5. The invention as defined in claim 4 wherein:
   a fixed attenuator is coupled to each output of the first pair of audio gates for reducing the signals of the selected channels; and
   the second pair of audio gates comprise solid state switches.

6. The invention as defined in claim 1 wherein the plurality of input channels comprise two sets of inputs, and for each set:
   the switch means of the interface includes first and second audio gates in series for selecting one channel from each set of inputs;
   an attenuator between the first and second audio gates;
   gain means following the second audio gate; and
   the attenuator means comprises a digitally controlled programmable attenuator following the gain means for each selected channel.

* * * * *